(12) United States Patent
Mattocci

(10) Patent No.: US 9,931,802 B2
(45) Date of Patent: Apr. 3, 2018

(54) METHOD AND SYSTEM FOR MANUFACTURING A TYRE TREAD WITH LUGS

(71) Applicant: BRIDGESTONE CORPORATION, Tokyo (JP)

(72) Inventor: Roberto Mattocci, Genzano di Rome (IT)

(73) Assignee: BRIDGESTONE CORPORATION, Tokyo (JP)

( * ) Notice: Subject to any disclaimer, the term of this patent is extended or adjusted under 35 U.S.C. 154(b) by 611 days.

(21) Appl. No.: 14/395,688

(22) PCT Filed: Apr. 19, 2013

(86) PCT No.: PCT/IB2013/053119
§ 371 (c)(1),
(2) Date: Oct. 20, 2014

(87) PCT Pub. No.: WO2013/156983
PCT Pub. Date: Oct. 24, 2013

(65) Prior Publication Data
US 2015/0107755 A1    Apr. 23, 2015

(30) Foreign Application Priority Data

Apr. 20, 2012    (IT) .............................. TO2012A0354

(51) Int. Cl.
  *B29D 30/54*    (2006.01)
  *B29D 30/58*    (2006.01)
  (Continued)

(52) U.S. Cl.
  CPC ............ *B29D 30/54* (2013.01); *B29D 30/52* (2013.01); *B29D 30/58* (2013.01); *B29D 30/66* (2013.01);
  (Continued)

(58) Field of Classification Search
  CPC ........ B29D 30/52; B29D 30/54; B29D 30/58; B29D 30/66; B29D 2030/541; B29D 2030/544; B29D 2030/667
  See application file for complete search history.

(56) References Cited

U.S. PATENT DOCUMENTS 2,990,874 A    7/1961    Hawkinson
3,464,874 A *  9/1969    Ragan .................... B29D 30/54
                                                    156/129

(Continued)

FOREIGN PATENT DOCUMENTS

AU    37977/85 A *  8/1985
DE    1729806 A  *  7/1971
(Continued)

OTHER PUBLICATIONS

Machine translation for Japan 2004-182043 (no date).*
(Continued)

*Primary Examiner* — Steven D Maki
(74) *Attorney, Agent, or Firm* — Oliff PLC

(57) ABSTRACT

A method and system for manufacturing a tire tread with lugs, the tread having a tread base, and a number of lugs projecting upwards from the tread base; the method having the steps of: preparing a green-rubber blank tread of constant thickness; applying rubber blocks to the areas of the blank tread where the lugs are to be formed, each block varying lengthwise in cross section, so it is thinner at the center and thicker at the side; and curing the blank tread, together with the blocks, in a curing mold negatively reproducing the pattern of the tread.

13 Claims, 12 Drawing Sheets

(51) Int. Cl.
*B29D 30/52* (2006.01)
*B29D 30/66* (2006.01)

(52) U.S. Cl.
CPC ... *B29D 2030/548* (2013.01); *Y10T 156/1768* (2015.01)

(56) References Cited

U.S. PATENT DOCUMENTS

| | | | |
|---|---|---|---|
| 3,511,291 A | 5/1970 | Ragan | |
| 3,770,038 A | 11/1973 | Wolfe | |
| 4,016,915 A * | 4/1977 | Astley | B60C 9/06 |
| | | | 152/209.12 |
| 4,547,241 A * | 10/1985 | Massey | B29C 35/007 |
| | | | 156/382 |
| 6,089,294 A * | 7/2000 | Suzuki | B29D 30/48 |
| | | | 152/541 |

FOREIGN PATENT DOCUMENTS

| | | | |
|---|---|---|---|
| FR | 1 355 972 | | 3/1964 |
| GB | 1032746 A | * | 6/1966 |
| JP | 2004-182043 A | * | 7/2004 |
| WO | WO-2012/001544 A1 | * | 1/2012 |
| WO | WO 2012/001544 A1 | | 1/2012 |

OTHER PUBLICATIONS

Machine translation for Germany 1,729,806 (no date).*
International Search Report issued in International Application No. PCT/IB2013/053119 dated Aug. 27, 2013.

* cited by examiner

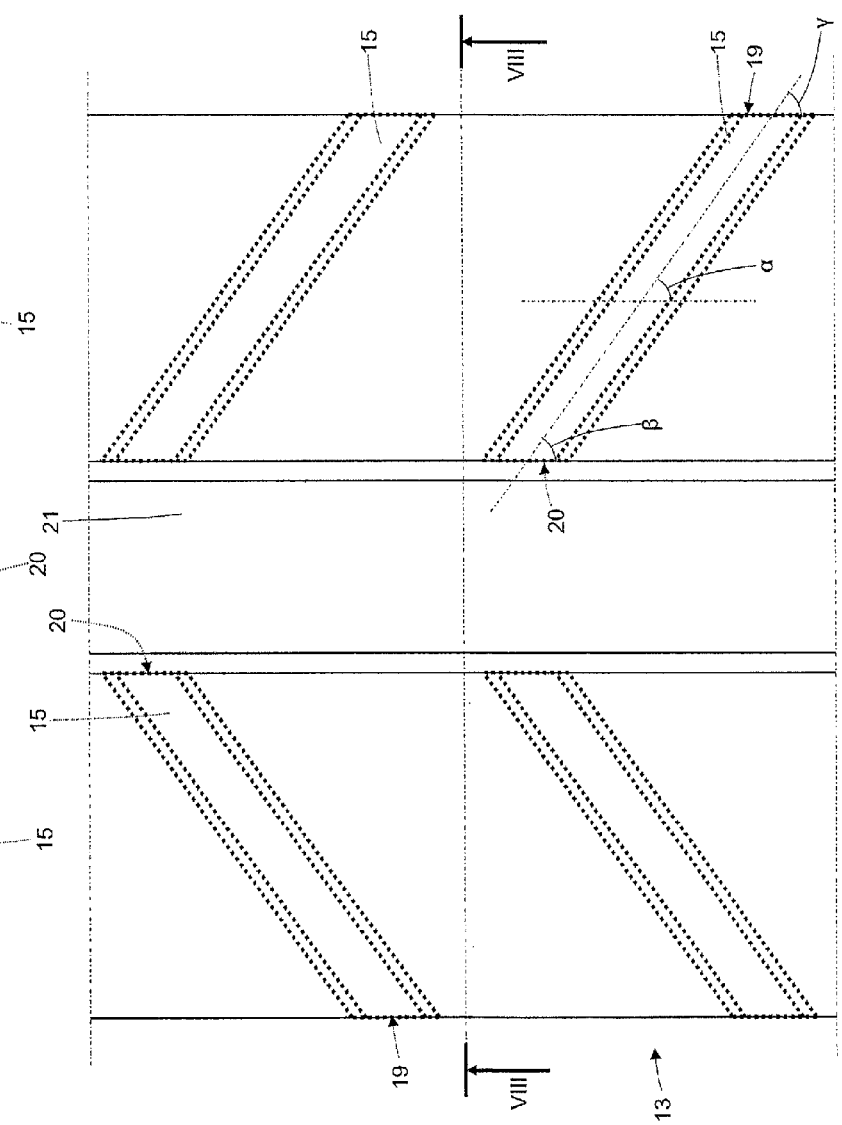

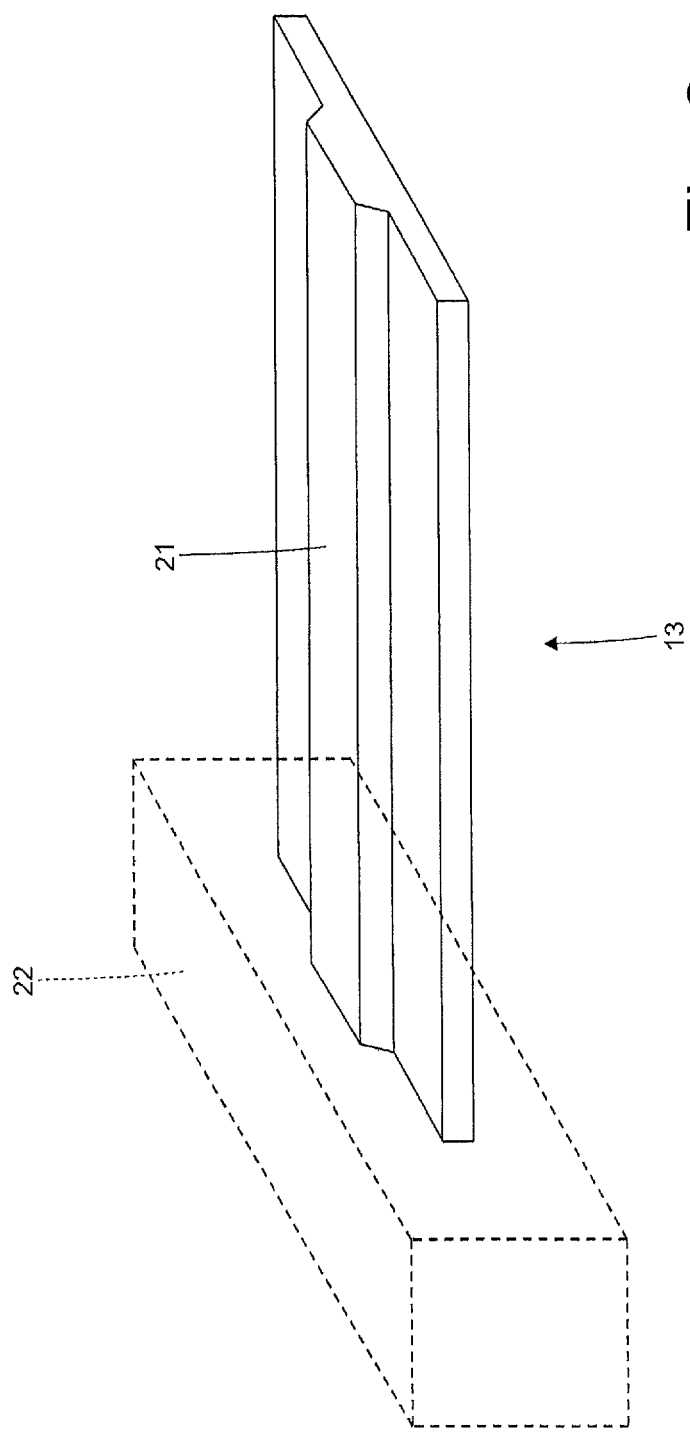

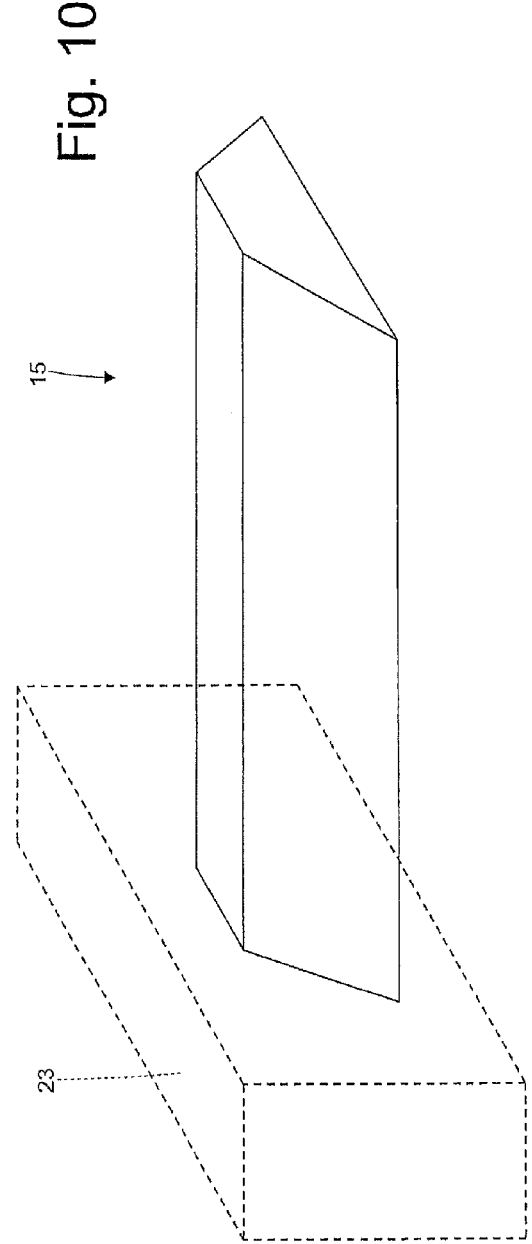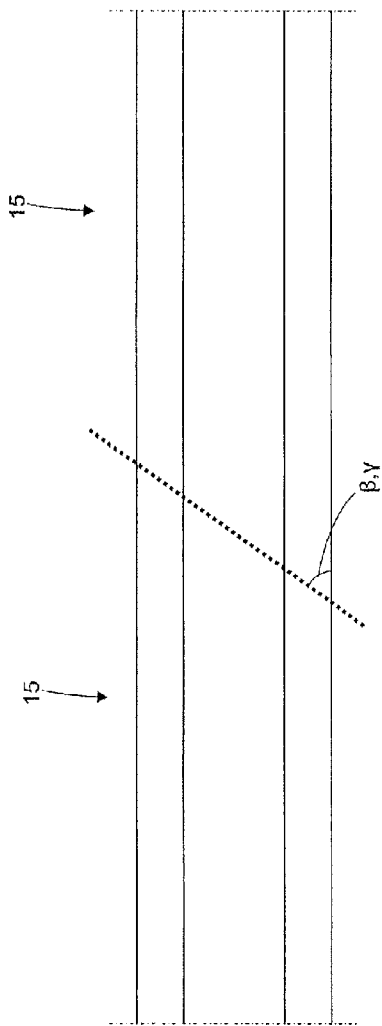

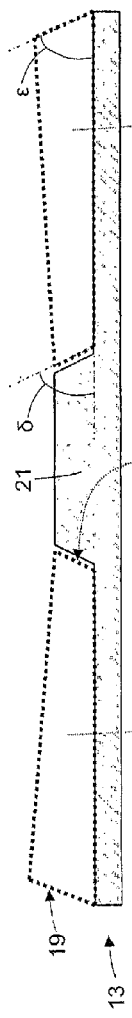
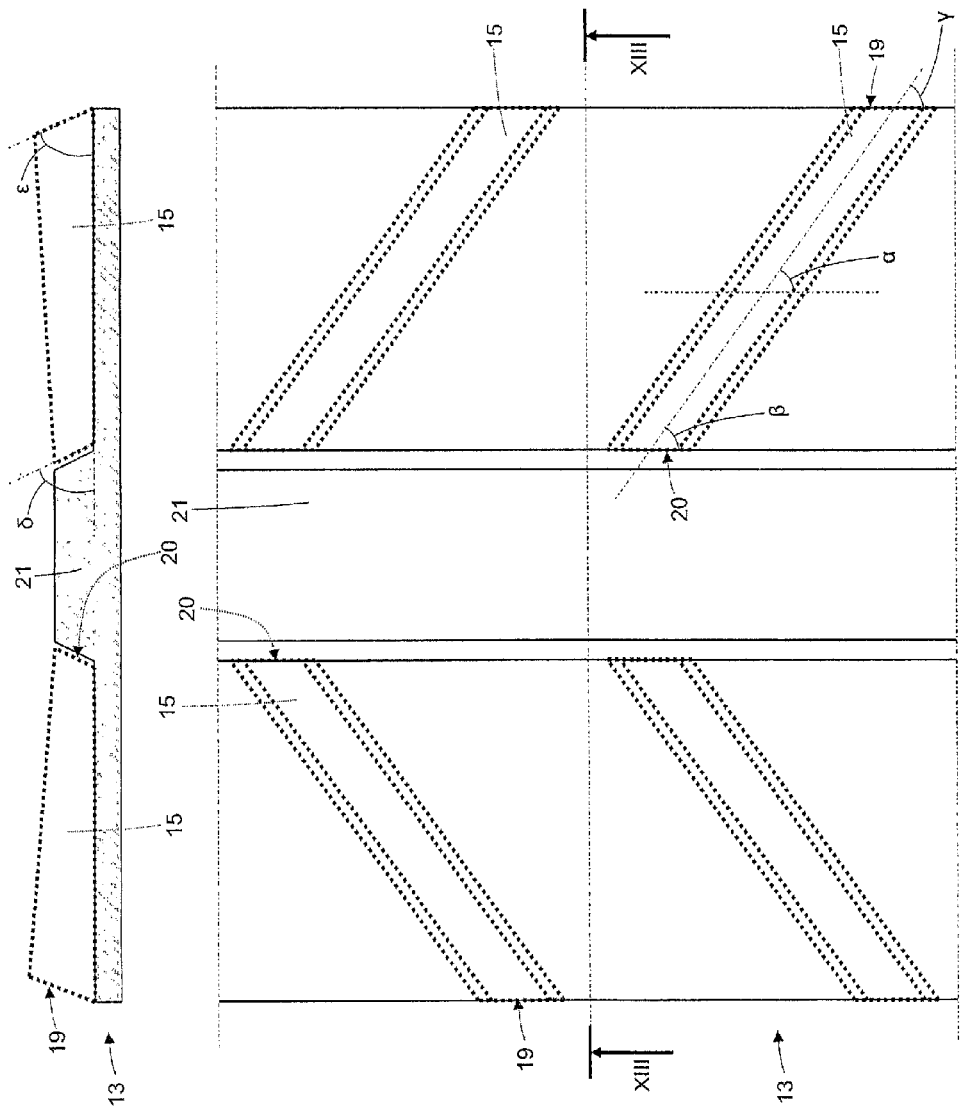

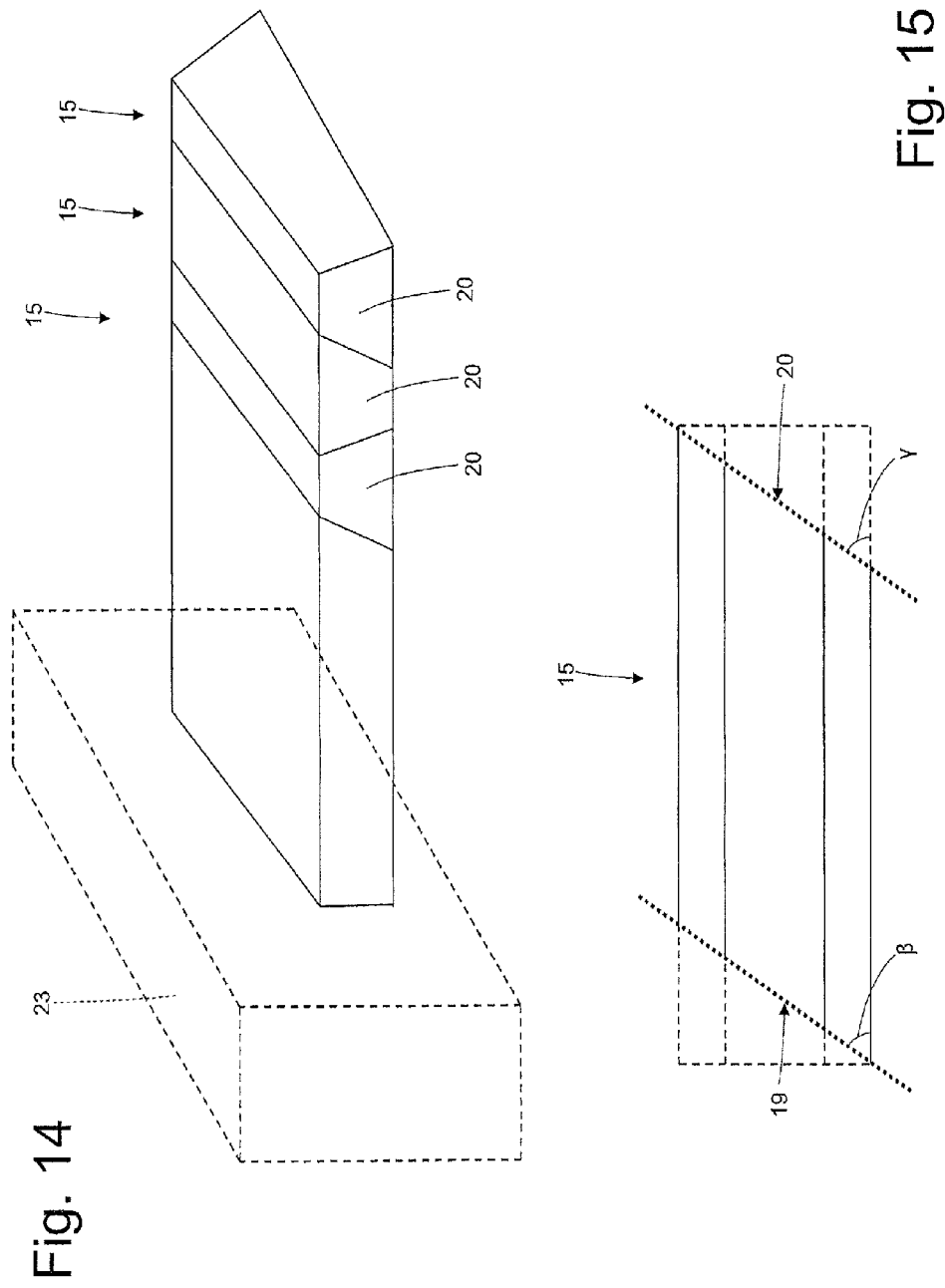

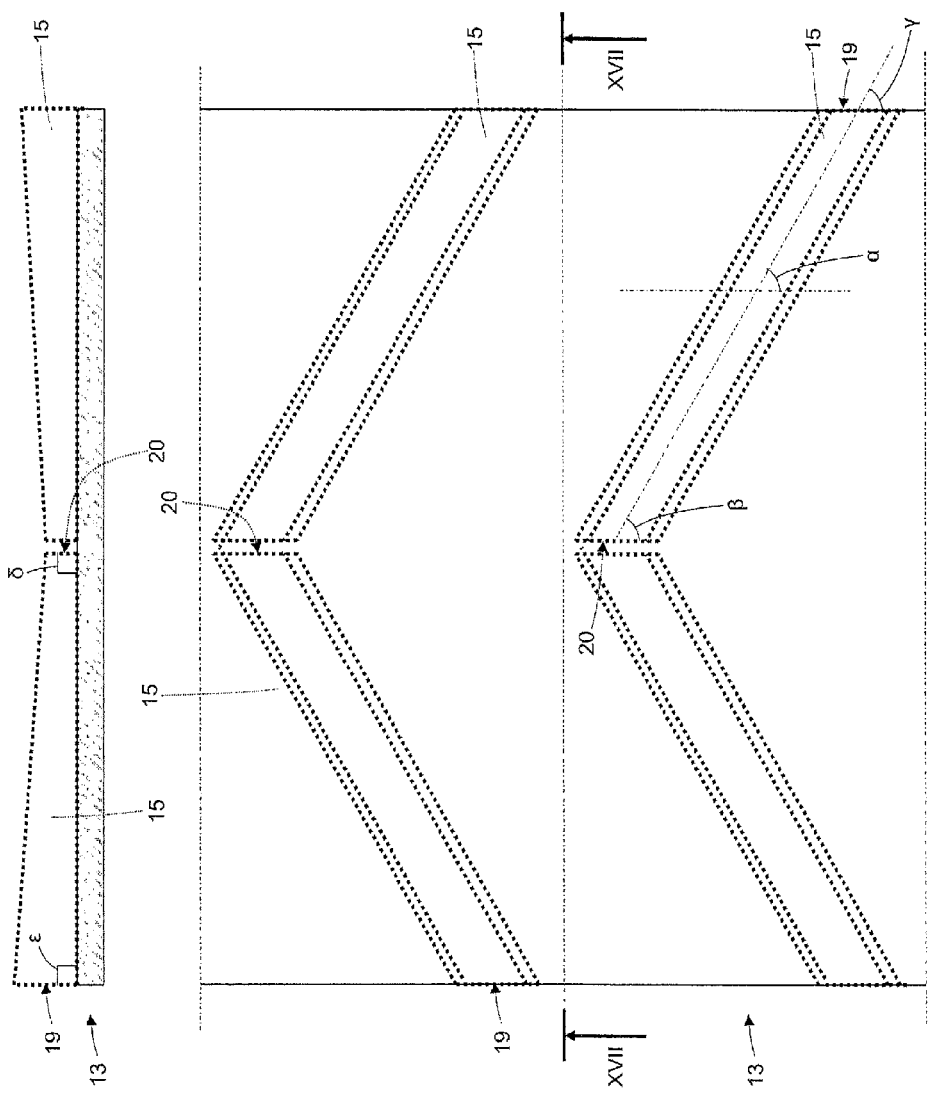

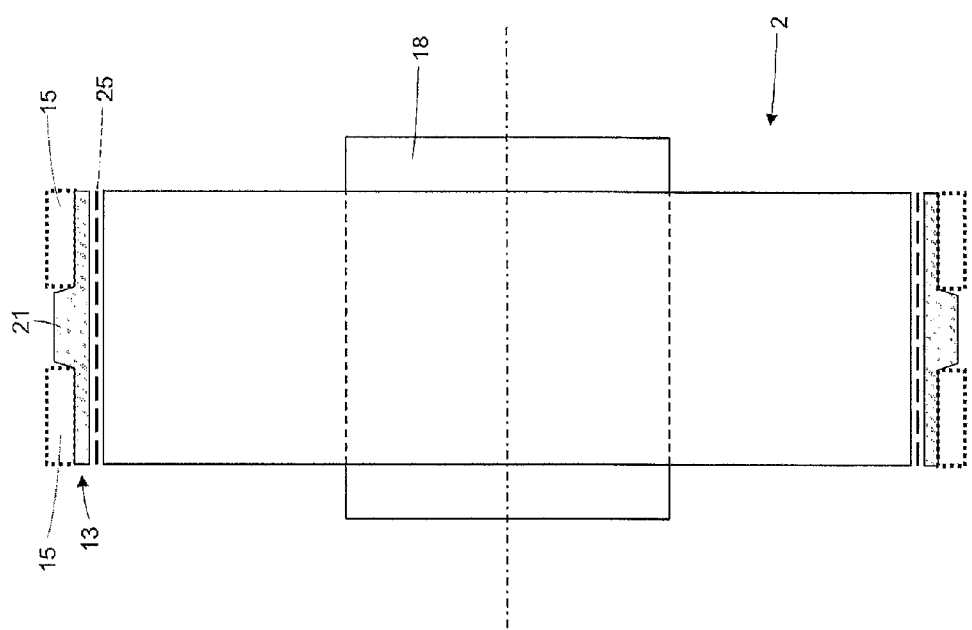

METHOD AND SYSTEM FOR MANUFACTURING A TYRE TREAD WITH LUGS

TECHNICAL FIELD

The present invention relates to a method and system for manufacturing a tyre tread with lugs.

The present invention may be used to advantage for producing farm vehicle tyre treads. It is important to note that the term 'farm vehicle tyre' is intended to mean a tyre used on off-road work vehicles, and so refers not only to farm vehicles but also earthmoving machinery or similar.

BACKGROUND ART

A farm vehicle tyre has a tread with a toroidal base surface that extends about a central axis of rotation; and a number of lugs project radially from the base surface, and extend substantially crosswise to the travelling direction of the tyre.

At present, to produce a farm vehicle tyre, a tyre casing is prepared and wound onto a building drum; the tread belts are wound about the casing on the building drum, and a smooth, green-rubber blank tread is wound over the belts; and the casing, wound with the belts and the blank tread, is inserted inside a curing mold negatively reproducing the tread pattern. During the curing process, the rubber of the blank tread is heated and subjected to high pressure to adapt to the shape of the curing mold and so form the tread pattern.

The tread pattern includes the lugs, which are exceptionally large and, above all, project upwards considerably from the rest of the tread (even by as much as ten centimeters at the highest point). Forming the lugs in the curing mold therefore involves considerable rubber displacement inside the mold, i.e. a large amount of rubber must migrate from one part of the mold to another. This rubber displacement inside the curing mold, i.e. the large amount of rubber that has to be pressured into forming the lugs, prevents the formation of an evenly thick tread base. In other words, migration of a large amount of rubber inside the curing mold results in the formation of an 'uneven' tread base (i.e. differing widely in thickness) which may result in defects, rippling and unsightly flaws.

To prevent too thin a rubber thickness at the thinnest parts of the tread base, the average thickness of the tread base must be 'oversized' with respect to an optimum thickness that could be used if the tread base were of perfectly even thickness. In other words, to prevent too thin a rubber thickness at the thinnest parts of the tread base, the whole tread base must be made thicker using more rubber. Oversizing the average thickness of the tread base means more material (rubber) is required to produce the tyre (with no advantage whatsoever in terms of nominal tyre performance), thus increasing the manufacturing cost and weight of the tyre.

Moreover, because the size of the green-rubber tread cross section is calculated according to tyre size, the known production method described above requires a different green-rubber tread cross section for each tyre radius. In other words, the green-rubber tread cross section of a 420/85 R24 tyre, for example, cannot be used for a 420/85 R28, R30, R34 or R38 tyre.

To eliminate these drawbacks, it has been proposed to reduce the thickness of the blank tread wound about the casing (with the belts in between), and to apply green-rubber blocks to the areas of the blank tread where the lugs are to be formed. This reduces the amount of rubber that has to migrate from one part of the curing mold to another, by providing more rubber (in the form of rubber blocks) where it is needed (to form the lugs) right from the outset. Even using rubber blocks, however, the thickness of the tread base still remains significantly uneven, especially at the shoulders of the tyre where the lugs are larger. In other words, even using rubber blocks, the average thickness of the tread base must be 'oversized' with respect to an optimum thickness that could be used if the tread base were of perfectly even thickness.

U.S. Pat. No. 3,770,038A describes a method of producing a lugged tyre, whereby a green-rubber blank tread is produced; rubber blocks are applied to the areas of the blank tread where the lugs are to be formed; and the blank tread, together with the blocks, is cured in a curing mold.

DESCRIPTION OF THE INVENTION

It is an object of the present invention to provide a method and system for manufacturing a tyre tread with lugs, which method and system are designed to eliminate the above drawbacks and, in particular, are cheap and easy to implement.

According to the present invention, there are provided a method and system for manufacturing a tyre tread with lugs, as claimed in the accompanying Claims.

BRIEF DESCRIPTION OF THE DRAWINGS

A number of non-limiting embodiments of the present invention will be described by way of example with reference to the attached drawings, in which:

FIG. 7 shows a plan view of a portion of a blank tread used in the FIG. 5 system;
FIG. 8 shows a cross section along line VIII-VIII of the FIG. 7 blank tread;
FIG. 9 shows a schematic view in perspective of an extruder for extruding the FIG. 7 blank tread;
FIG. 10 shows a schematic view in perspective of an extruder for extruding green-rubber blocks for application to the FIG. 7 blank tread;
FIG. 11 shows a schematic plan view of a crosswise cut to separate two consecutive FIG. 10 blocks;
FIG. 12 shows a plan view of a portion of an alternative embodiment of a blank tread used in the FIG. 5 system;
FIG. 13 shows a cross section along line XIII-XIII of the FIG. 12 blank tread;
FIG. 14 shows a schematic view in perspective of an extruder for extruding green-rubber blocks for application to the FIG. 12 blank tread;
FIG. 15 shows a schematic plan view of a crosswise cut to shape a FIG. 14 block;
FIG. 16 shows a plan view of a portion of a further embodiment of a blank tread used in the FIG. 5 system;
FIG. 17 shows a cross section along line XVII-XVII of the FIG. 16 blank tread;

FIG. 18 shows a schematic of the FIG. 6 building drum used in an alternative embodiment.

PREFERRED EMBODIMENTS OF THE INVENTION

Figure 2:
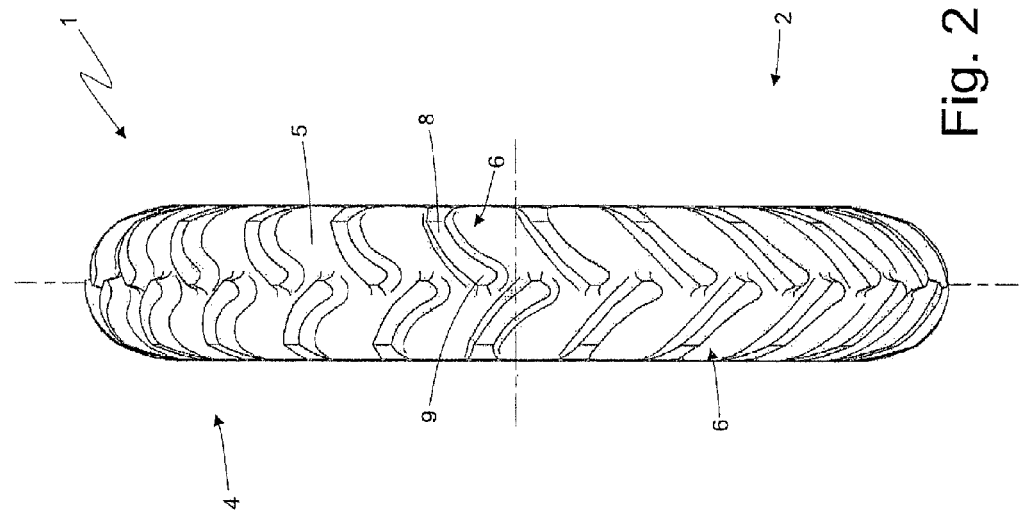
FIG. 2 shows a front view of the FIG. 1 farm vehicle tyre.
Figure 1:
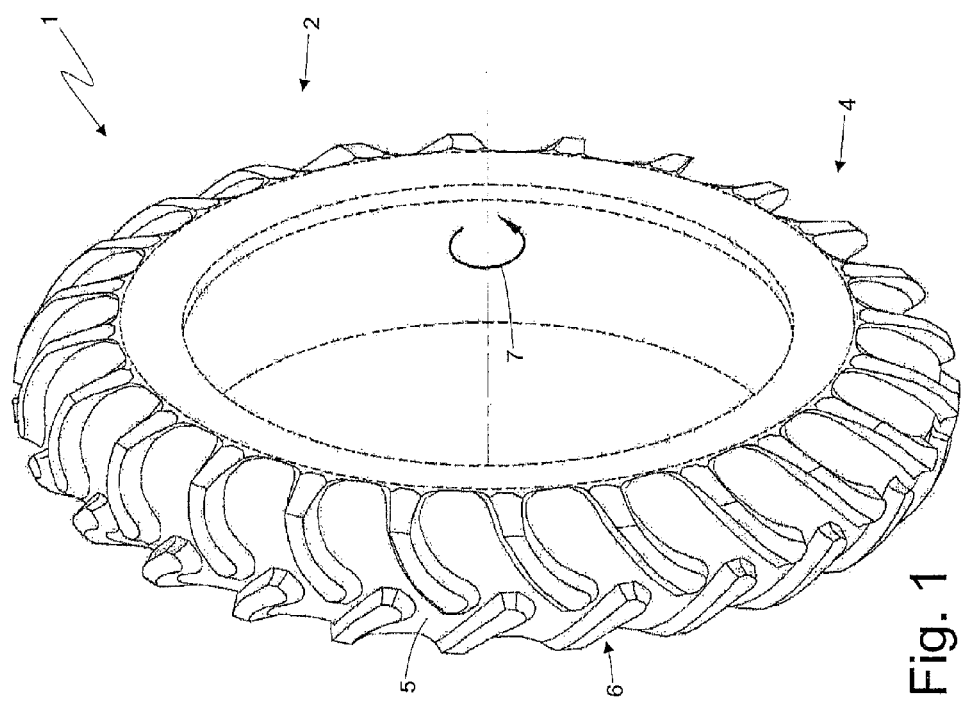
FIG. 1 shows a view in perspective of a farm vehicle tyre.
Figure 3:
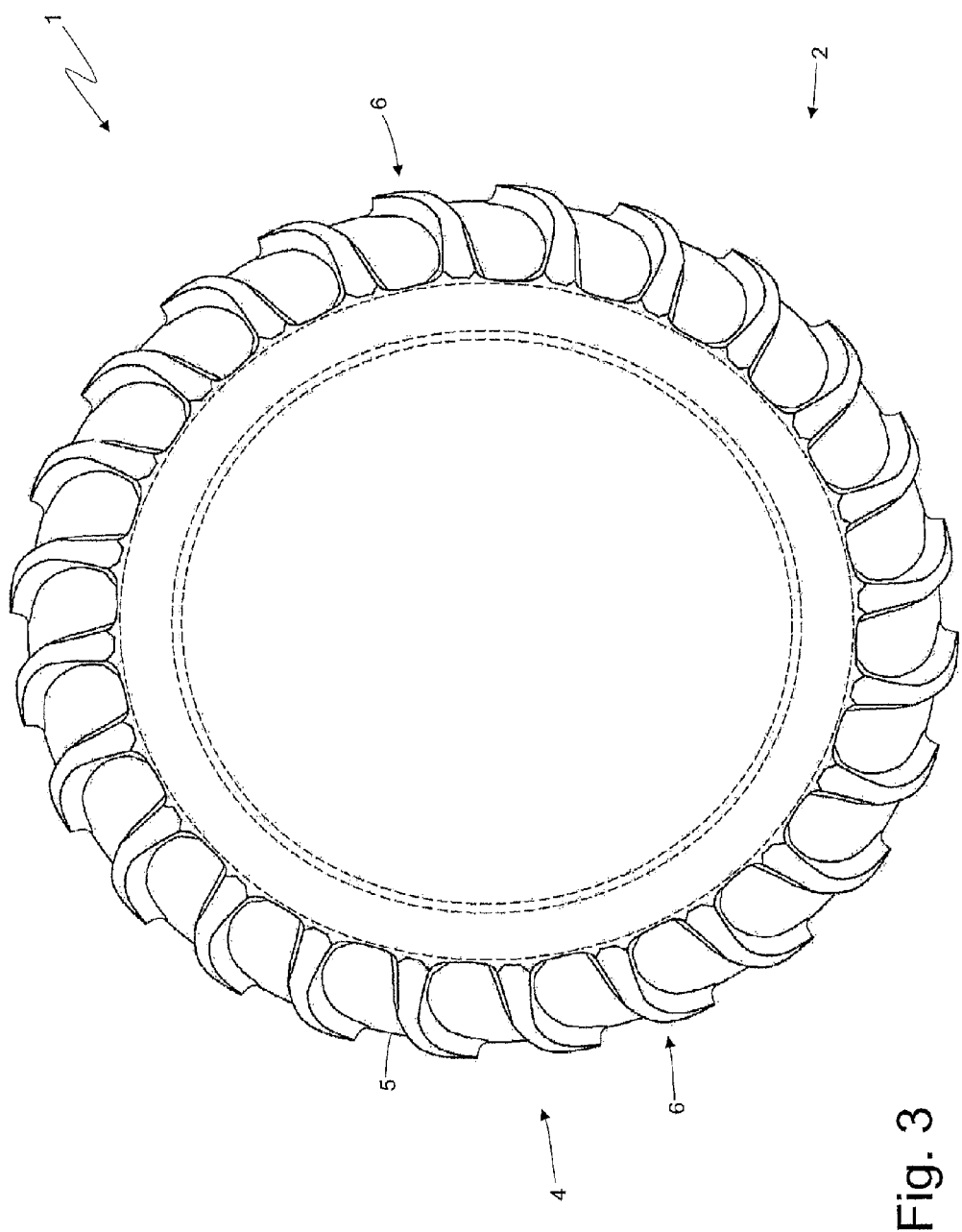
FIG. 3 shows a side view of the FIG. 1 farm vehicle tyre.
Figure 4:
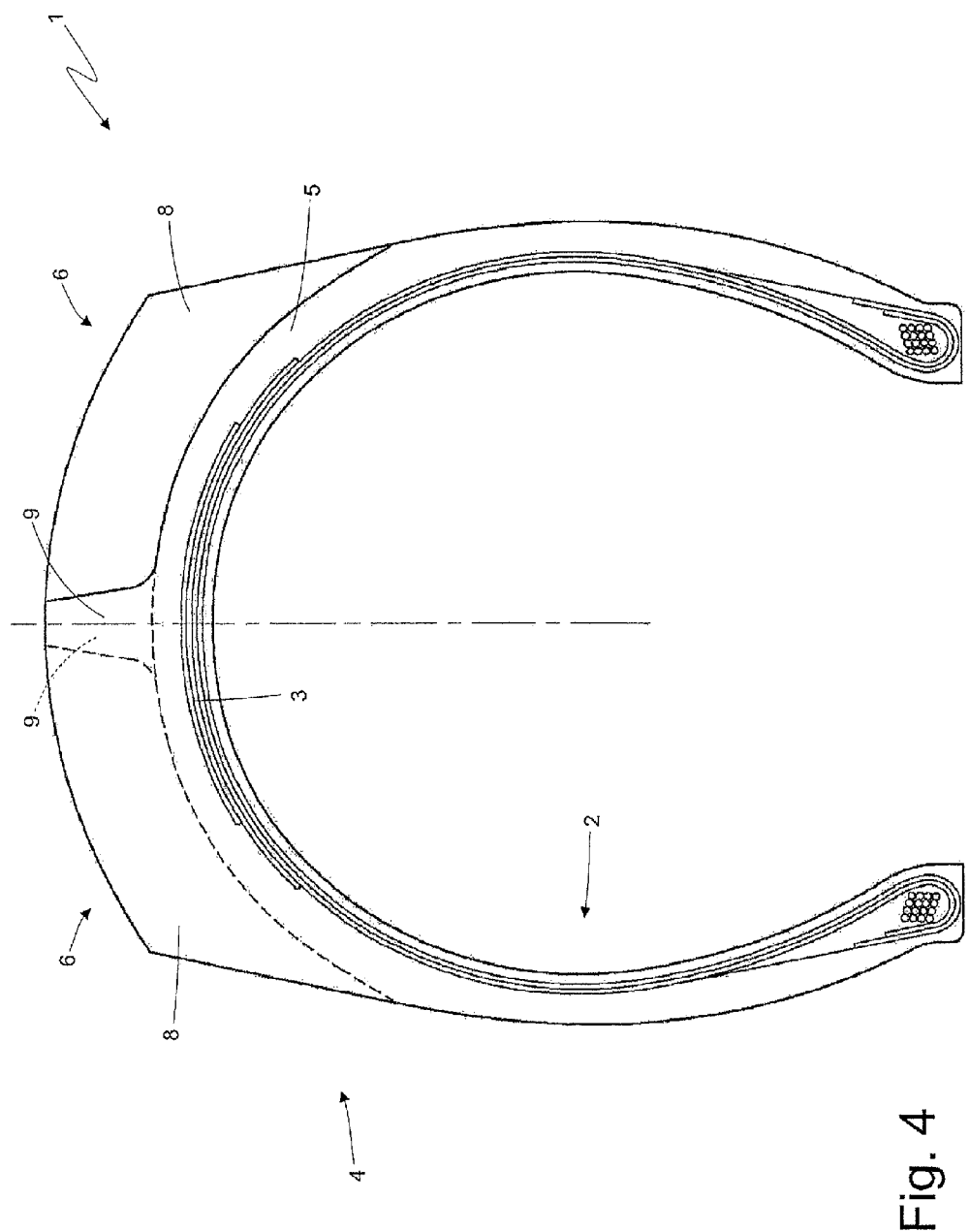
FIG. 4 shows a schematic cross section of part of the FIG. 1 farm vehicle tyre.

Number 1 in FIGS. 1-4 indicates as a whole a farm vehicle tyre.

Tyre 1 comprises a toroidal casing 2, which extends about a central axis of rotation and supports tread belts 3 wound about casing 2, and a tread 4 wound about casing 2 and over belts 3. Tread 4 comprises a tread base 5, which completely covers casing 2 and is of substantially constant thickness; and a number of lugs 6, which project upwards (i.e. extend radially outwards) from tread base 5 and are arranged symmetrically about the axis of rotation. Each lug 6 curves from the centreline of tyre 1 to a corresponding shoulder of tyre 1, has a truncated-cone-shaped cross section (tapering away from tread base 5), and has a front wall and a rear wall with respect to a given rolling direction 7 of tyre 1. Each lug 6 has a lateral portion 8 at a shoulder of tyre 1; and a centre portion 9 located in the centre area of tyre 1. As shown clearly in FIG. 4, each lug 6 is thinner at centre portion 9, and thicker at lateral portion 8. As shown clearly in FIG. 2, centre portion 9 of each lug 6 has a greater curvature than lateral portion 8 (roughly speaking, lateral portion 8 may be assumed to be substantially straight).

Figure 5:
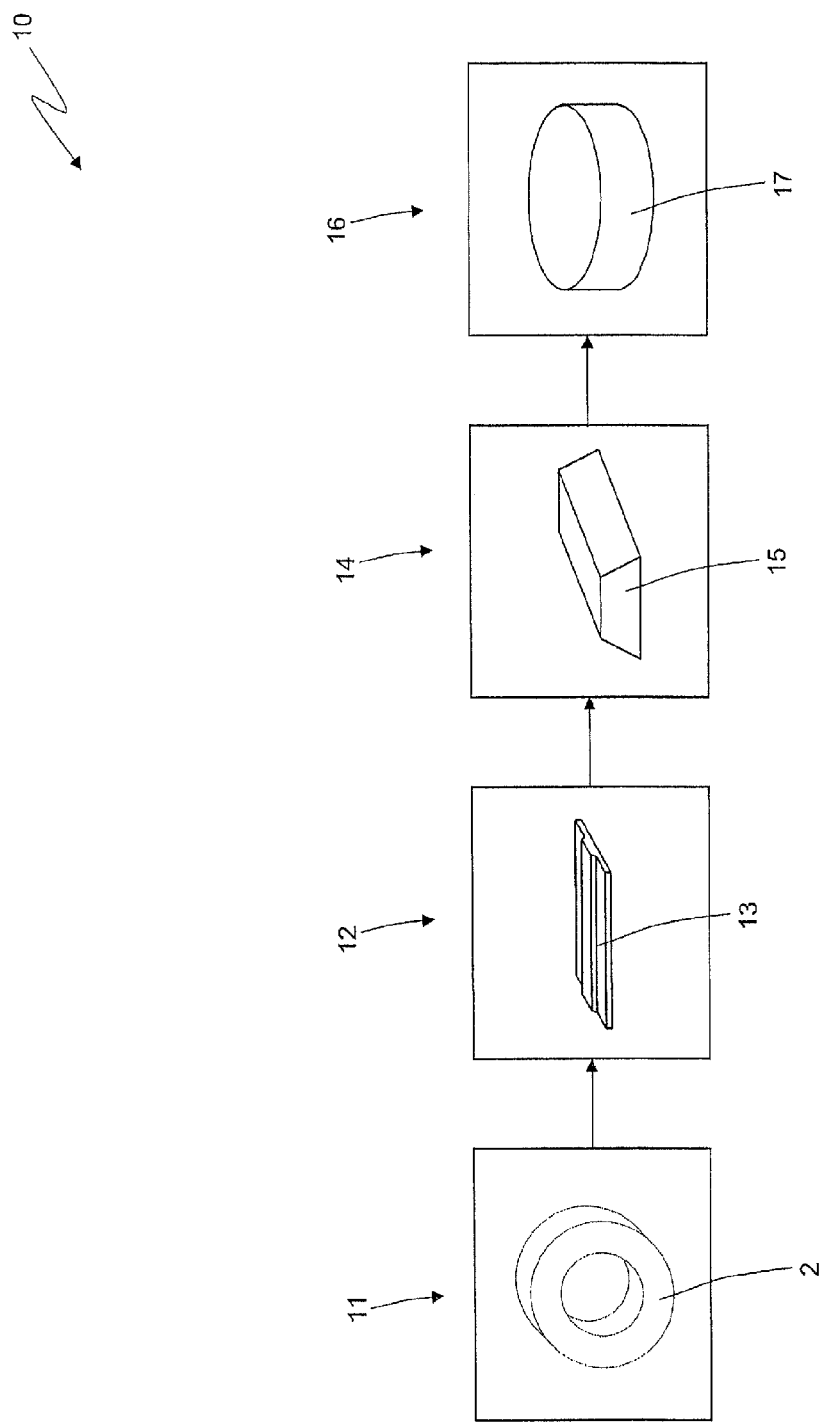
FIG. 5 shows a schematic of a system, in accordance with the present invention, for manufacturing the FIG. 1 farm vehicle tyre.

Number 10 in FIG. 5 indicates as a whole a system for manufacturing farm vehicle tyre 1. System 10 comprises a building unit 11 for producing casing 2 of tyre 1; a winding unit 12, which winds first belts 3 and then a green-rubber blank tread 13 about casing 2; an application unit 14, which applies green-rubber blocks 15 to the areas of blank tread 13 where lugs 6 are to be formed; and a curing unit 16 for curing casing 2, together with belts 3, blank tread 13 and blocks 15, in a curing mold 17 negatively reproducing the pattern of tread 4. In an alternative embodiment, blocks 15 may be made of cured, as opposed to green, rubber, i.e. may be pre-cured.

Figure 6:
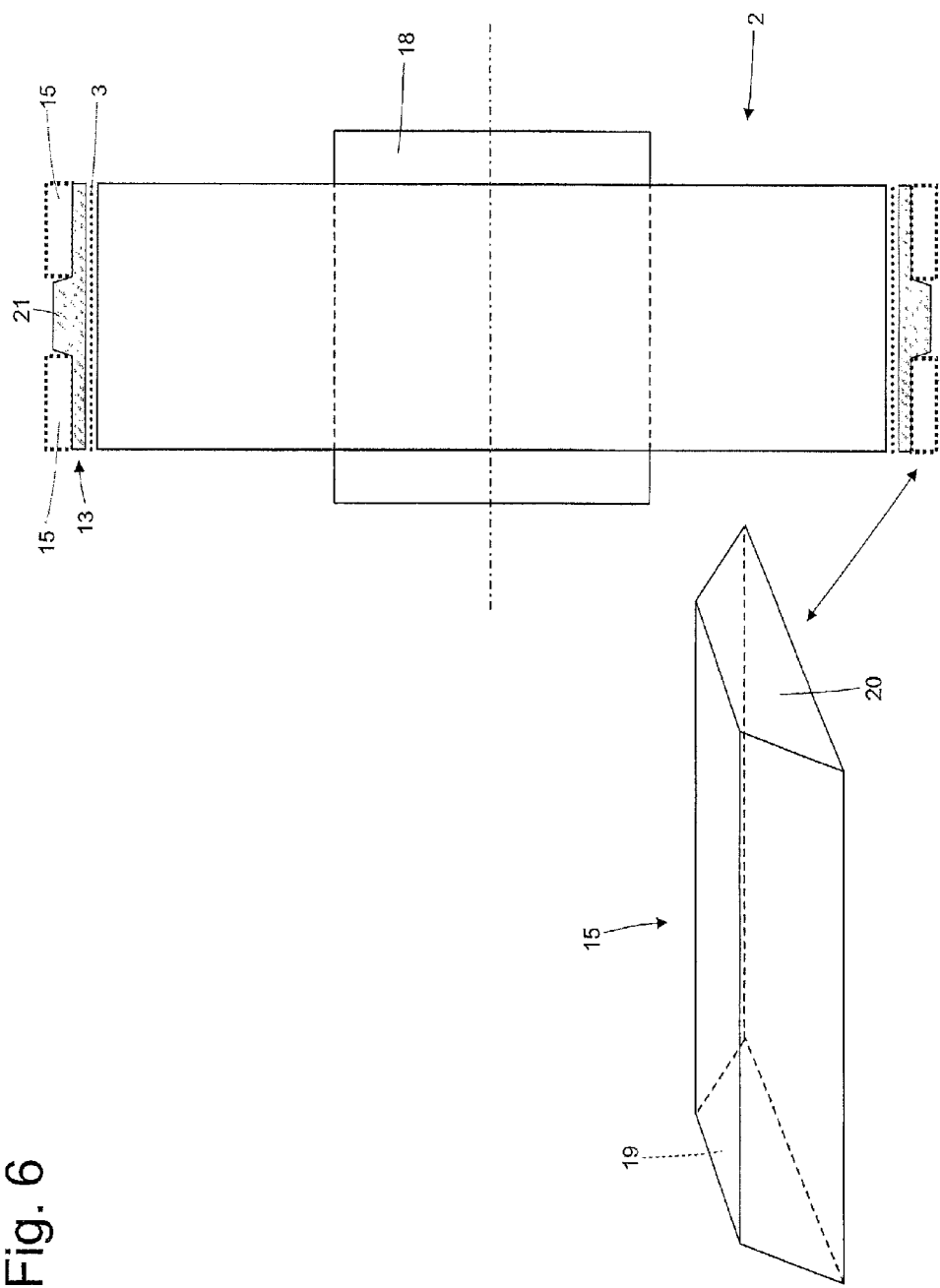
FIG. 6 shows a schematic of a building drum of the FIG. 5 system.

As shown in FIG. 6, casing 2 produced on building unit 11 is mounted onto a building drum 18 powered to successively receive belts 3, blank tread 13 and blocks 15. In other words, once casing 2 is mounted on building drum 18, belts 3 are wound about casing 2, blank tread 13 is wound about casing 2 and over belts 3, and blocks 15 are applied to blank tread 13 wound about casing 2. Each block 15 has an outer wall 19 at a shoulder of blank tread 13; and an inner wall 20 opposite outer wall 19 and located in the centre area of blank tread 13.

In the FIGS. 6, 7 and 8 embodiment, blank tread 13 is thinner at the sides and thicker at the centre, so as to define a raised centre portion 21 against which inner walls 20 of blocks 15 rest. Inside curing mold 17, blocks 15 therefore eventually form lateral portions 8 of lugs 6, and raised centre portion 21 eventually forms centre portions 9 of lugs 6. In other words, inside curing mold 17, the rubber needed to form lateral portions 8 of lugs 6 comes mostly from blocks 15, while the rubber needed to form centre portions 9 of lugs 6 comes mostly from raised centre portion 21 of blank tread 13.

In a preferred embodiment shown in FIG. 8, blank tread 13 is of constant thickness outwards of raised centre portion 21; and raised centre portion 21 of blank tread 13 has a trapezoidal cross section. (Alternatively, raised centre portion 21 of blank tread 13 may have a rectangular cross section).

In a preferred embodiment shown in FIG. 9, blank tread 13 has a constant cross section along its whole length, and is extruded by an extruder 22.

In a preferred embodiment shown in FIG. 7, each block 15 is positioned at an angle with respect to raised centre portion 21, i.e. with respect to a circumferential plane of blank tread 13 (following, as stated, the areas where lugs 6 are to be formed) so that block 15 forms an acute angle α with a circumferential plane.

To distribute the green rubber more evenly inside curing mold 17, the inner wall 20 of each block 15 contacting raised centre portion 21 is shaped on a slant to form an acute angle β with the longitudinal axis of block 15. Preferably (but not necessarily), acute angle β equals acute angle α, so that inner wall 20 is parallel to raised centre portion 21.

Preferably, to distribute the green rubber more evenly inside curing mold 17, the inner wall 20 of each block 15 contacting raised centre portion 21 is shaped on a slant to also form an acute angle δ with the tangential plane of blank tread 13. Preferably (but not necessarily), acute angle δ is supplementary to the angle formed by the lateral walls of raised centre portion 21 with the tangential plane of blank tread 13. In other words, inner wall 20 of each block 15 slopes doubly: by acute angle β with respect to the longitudinal axis of block 15, and by acute angle δ with respect to the tangential plane of blank tread 13.

Preferably, to distribute the green rubber more evenly inside curing mold 17, the outer wall 19 of each block 15 is also shaped on a slant to form an acute angle γ with the longitudinal axis of block 15. Preferably (but not necessarily), acute angle γ equals acute angle α, so that outer wall 19 is parallel to raised centre portion 21 and inner wall 20. In other words, preferably (but not necessarily), the two opposite walls 19 and 20 of each block 15 are parallel to each other and slope with respect to the longitudinal axis of block 15.

Preferably, to distribute the green rubber more evenly inside curing mold 17, outer wall 19 of each block 15 is also shaped on a slant to form an acute angle ε with the tangential plane of blank tread 13. Preferably (but not necessarily), acute angle ε equals angle δ, so outer wall 19 is parallel to inner wall 20. In other words, outer wall 19 of each block 15 slopes doubly: by acute angle γ with respect to the longitudinal axis of block 15, and by acute angle ε with respect to the tangential plane of blank tread 13.

In a preferred embodiment shown in FIG. 10, each block 15 has a constant trapezoidal cross section along its whole length, and is extruded by an extruder 23. More specifically, extruder 23 extrudes a continuous rubber strip with the same trapezoidal cross section as blocks 15; and blocks 15 are cut off the continuous rubber strip from extruder 23 by a crosswise cut in a plane inclined at an angle equal to acute angle β (normally equal to acute angle γ), and at a further angle equal to acute angle δ (normally equal to acute angle ε).

In the FIGS. 7-10 embodiment, each block 15 has a constant trapezoidal cross section along its whole length. In the FIGS. 12-14 embodiment, each block 15 has a trapezoidal cross section varying lengthwise, so as to be thinner at inner wall 20 and thicker at outer wall 19. Preferably, the thickness of each block 15 increases evenly (linearly) from inner wall 20 to outer wall 19. Alternatively, the thickness of each block 15 may increase discontinuously (in steps) from inner wall 20 to outer wall 19.

Varying the cross section of each block 15 lengthwise provides for further improving rubber displacement inside curing mold 17, by providing more rubber at the shoulders of tyre 1 (i.e. at lateral portions 8, where lugs 6 are thicker) and less rubber in the centre area of tyre 1 (i.e. at centre portions 9, where lugs 6 are thinner). On the other hand, forming blocks 15 with a lengthwise-varying cross section is more complicated (and therefore takes longer and is more expensive).

As shown in FIG. 14, blocks 15 may be formed by extruding, on extruder 23, a continuous rubber strip with a cross section identical to the longitudinal section of blocks 15; and by cutting blocks 15 off the continuous rubber strip by a crosswise cut in an inclined plane (as shown clearly in FIG. 14, the blocks are cut off the continuous rubber strip so they face alternately upwards and downwards, by continually inverting the angle of the cutting plane). As shown in FIG. 15, once cut off the continuous rubber strip, each block 15 is cut at opposite ends to form inner wall 20 and outer wall 19 sloping at corresponding (possibly different) angles β and γ, and at corresponding (possibly different) angles δ and ε.

In a further embodiment shown in FIGS. 16 and 17, when (and only when) blocks 15 vary lengthwise in cross section (i.e. are thinner at inner wall 20 and thicker at outer wall 19), a blank tread 13 of constant thickness (i.e. with no raised centre portion 21) may be used.

In one possible embodiment, to improve grip of blocks 15 to blank tread 13 (and so prevent accidental movement of blocks 15 when inserting casing 2 inside curing mold 17), cement is applied between a bottom surface of each block 15 and a top surface of blank tread 13. Alternatively or in addition to cement, to improve grip of blocks 15 to blank tread 13, the bottom surface of each block 15 and/or the top surface of blank tread 13 may be pre-heated (e.g. using infrared-ray lamps for non-contact heating).

In one possible embodiment, blank tread 13 is made from a softer first rubber compound, and blocks 15 are made from a different second rubber compound harder than the first. This embodiment makes it possible to improve both performance and working life of tyre 1, by making lugs 6 (substantially formed from the rubber of blocks 15) harder (and therefore more wear resistant), while tread base 5 (substantially formed from the rubber of blank tread 13) is softer and so able to better distribute mechanical stress produced by the rolling movement of the tyre.

In the FIG. 6 embodiment, building unit 11 produces a new casing 2 for producing a new tyre 1 (in fact, belts 3 are first wound about the 'virgin' casing 2). In an alternative embodiment shown schematically in FIG. 18, building unit 11 starts with a worn tyre 1 for retreading. First of all, the worn tread is removed from tyre 1 to expose an intermediate surface of casing 2 underneath (at any rate, a surface over the existing belts 3), and the intermediate surface of casing 2 is skived. Once the skiving operation is completed, casing 2 is wound with a green-rubber cushion 25; blank tread 13 is then wound about casing 2, on top of green-rubber cushion 25; and blocks 15 are applied as described above to blank tread 13. Finally, casing 2, together with green-rubber cushion 25, blank tread 13 and blocks 15, is cured in a toroidal curing mold 17 to produce a retreaded tyre 1.

In the above embodiments, blocks 15 are applied to blank tread 13 after it is wound about casing 2. In an alternative embodiment, blocks 15 may be applied to the flat blank tread 13, which is then wound, complete with blocks 15, about casing 2. In this embodiment, the flat blank tread 13, complete with blocks 15, may even be cured to form a pre-cured tread (PCT) 4, which is then wound about casing 2 as part of a 'cold' tyre building or retreading process.

The above method of manufacturing tread 4 of farm vehicle tyre 1 has numerous advantages.

First and foremost, the method described provides for minimizing rubber migration inside curing mold 17, and so achieving a highly even tread base 5, i.e. of more or less constant thickness over its whole area. As such, no 'oversizing' of the mean thickness of tread base 5 is necessary, thus enabling a significant reduction in the cost and total weight of tyre 1 for a given performance. It is important to note that, for casing 2, complete with blank tread 13 and blocks 15, to fit smoothly inside curing mold 17, there are strict geometric limitations as to the size of blank tread 13, and especially the size and shape of blocks 15. By virtue of raised centre portion 21 of blank tread 13 and/or the variation in the cross section of blocks 15, it is possible to achieve more or less perfect rubber distribution (i.e. to provide the rubber exactly where it is needed in the tread 4 pattern), as well as smooth insertion of casing 2, complete with blank tread 13 and blocks 15, inside curing mold 17.

Moreover, the method described allows the same size green-rubber tread cross section to be used for producing same-type tyres of different radii (i.e. permits 'size rim scaling') by maintaining a constant thickness of blank tread 13. That is, the different amount of rubber required to form a different number of lugs 6 is obtained by varying the number of blocks 15, with no change whatsoever in the thickness of blank tread 13. For example, the same size green-rubber tread cross section may be used to produce tyres 420/85 of radius R24, R28, R30, R34 and R38.

The invention claimed is:

1. A method of manufacturing a tire tread with lugs for a tire, the tread comprising a tread base; and a number of lugs, each of which projects upwards from the tread base, and has a lateral portion located at a shoulder of the tire, and a center portion located in the center area of the tire; the method comprising the steps of:
   preparing a green-rubber blank tread;
   extruding a continuous rubber strip having a cross section identical to a longitudinal section of rubber blocks and varies transversely so that the rubber strip is thinner at one side and thicker at the other side;
   cutting the blocks off the rubber strip by means of an inclined crosswise cut; and
   applying the blocks to the areas of the blank tread where the lugs are to be formed, each block having an outer wall located at a shoulder of the blank tread, and an inner wall opposite the outer wall and located in the center area of the blank tread;
   curing the blank tread, together with the blocks, in a curing mold negatively reproducing a pattern of the tread;
   wherein each block varies lengthwise in cross section, so it is thinner at the inner wall and thicker at the outer wall.

2. A method a claimed in claim 1, wherein each block increases evenly in thickness from the inner wall to the outer wall.

3. A method as claimed in claim 1, wherein the blocks are cut off the rubber strip so that they face alternately upwards and downwards, by continually inverting the angle of the cutting plane.

4. A method as claimed in claim 1, comprising the further steps of:
   positioning each block at an angle, so it forms a first acute angle with a circumferential plane; and
   shaping the inner wall and/or the outer wall of each block at an angle, so the inner wall and/or outer wall form a second acute angle and third acute angle respectively with the longitudinal axis of the block.

5. A method as claimed in claim 4, wherein the first, second and third acute angles are equal.

6. A method as claimed in claim 1, comprising the further step of shaping the inner wall and/or the outer wall of each block at an angle, so the inner wall and/or outer wall form a fourth acute angle and a fifth acute angle respectively with the tangential plane of the blank tread.

7. A method as claimed in claim 1, wherein the blank tread is of constant thickness, with a rectangular cross section.

8. A method as claimed in claim 1, wherein the blank tread has a constant cross section along its whole length.

9. A method as claimed in claim 1, wherein the step of applying each block comprises first applying cement between a bottom surface of the block and a top surface of the blank tread.

10. A method as claimed in claim 1, wherein the step of applying each block comprises preheating a bottom surface of the block and/or a top surface of the blank tread.

11. A method as claimed in claim 1, comprising the further steps of:
    making the blank tread from a first rubber compound; and
    making the blocks from a second rubber compound different from and harder than the first rubber compound.

12. A method as claimed in claim 1, comprising the further steps of:
    preparing a new casing of green rubber;
    winding belts about the casing;
    winding the blank tread about the casing, on top of the belts;
    applying the blocks to the blank tread wound about the casing; and
    curing the casing, together with the belts, the blank tread and the blocks, in the curing mold to complete production of a new tire.

13. A method as claimed in claim 1, comprising the further steps of:
    removing the worn tread from a used tire to expose an intermediate surface of the casing underneath;
    skiving the intermediate surface of the casing;
    winding a green-rubber cushion about the casing;
    winding the blank tread about the casing, on top of the green-rubber cushion;
    applying the blocks to the blank tread wound about the casing; and
    curing the casing, together with the green-rubber cushion, the blank tread and the blocks, in the curing mold to complete production of a retreaded tire.

* * * * *